US012753580B2

(12) United States Patent
Mitani

(10) Patent No.: US 12,753,580 B2
(45) Date of Patent: Oct. 6, 2026

(54) ACTUAL MACHINE MANAGEMENT DEVICE, AND ACTUAL MACHINE MANAGEMENT SYSTEM

(71) Applicant: KOBELCO CONSTRUCTION MACHINERY CO., LTD., Hiroshima (JP)

(72) Inventor: Tomotaka Mitani, Hiroshima (JP)

(73) Assignee: Kobelco Construction Machinery Co., Ltd., Hiroshima (JP)

(*) Notice: Subject to any disclaimer, the term of this patent is extended or adjusted under 35 U.S.C. 154(b) by 18 days.

(21) Appl. No.: 18/696,451

(22) PCT Filed: Jul. 8, 2022

(86) PCT No.: PCT/JP2022/027101
§ 371 (c)(1),
(2) Date: Mar. 28, 2024

(87) PCT Pub. No.: WO2023/074055
PCT Pub. Date: May 4, 2023

(65) Prior Publication Data

US 2025/0043544 A1 Feb. 6, 2025

(30) Foreign Application Priority Data

Oct. 27, 2021 (JP) ................................ 2021-175719

(51) Int. Cl.
*E02F 9/26* (2006.01)
*B60L 50/61* (2019.01)
(Continued)

(52) U.S. Cl.
CPC ................ *E02F 9/26* (2013.01); *B60L 50/61* (2019.02); *B60L 58/13* (2019.02); *E02F 9/2054* (2013.01);
(Continued)

(58) Field of Classification Search
CPC . E02F 9/26; E02F 9/2054; E02F 9/205; E02F 9/2091; B60L 50/61; B60L 58/13;
(Continued)

(56) References Cited

U.S. PATENT DOCUMENTS 12,294,917 B2 * 5/2025 Kobel ..................... H04L 67/12
2011/0254513 A1 * 10/2011 Kagoshima ........... B60W 10/26
320/162
(Continued)

FOREIGN PATENT DOCUMENTS

JP 2016-111808 A 6/2016
JP 2017-041952 A 2/2017
(Continued)

OTHER PUBLICATIONS

JP 6267629 B2 English Translation of the Description (Year: 2018).*
The English translation of PCT/ISA/210 from PCT/JP2022/027101.

*Primary Examiner* — Kito R Robinson
*Assistant Examiner* — Alexander V Gentile
(74) *Attorney, Agent, or Firm* — Carrier, Shende & Associates P.C.; Joseph P. Carrier; Jeffrey T. Gedeon

(57) ABSTRACT

An actual machine management device 300 configured to manage a plurality of work machines 400, 500 to be remotely operated, each work machine including a power storage device 440, 540 and a communication device 421, 521 capable of transmitting power storage information regarding the remaining amount of power storage of the power storage device 440, 540, the actual machine management device 300 configured to, based on the power storage information transmitted from each communication devices 421, 521 of the standby work machines 400, 500 in a standby state transmit the power storage information to notification devices 221, 225 at timing of notification about the remaining amount of power storage of the power storage
(Continued)

devices 440, 540, when for each of the standby work machines 400, 500 the remaining amount of power storage reaches or estimated to reach a predefined power storage threshold.

8 Claims, 6 Drawing Sheets

(51) Int. Cl.
*B60L 58/13* (2019.01)
*E02F 9/20* (2006.01)
*G08B 21/18* (2006.01)

(52) U.S. Cl.
CPC ....... *B60L 2200/40* (2013.01); *B60L 2240/54* (2013.01); *E02F 9/205* (2013.01); *G08B 21/182* (2013.01)

(58) Field of Classification Search
CPC ............. B60L 2200/40; B60L 2240/54; G08B 21/182; G01R 31/387; H01M 10/44; H01M 10/48; H02J 7/0048; H02J 7/00; H02J 13/00
See application file for complete search history.

(56) References Cited

U.S. PATENT DOCUMENTS

| | | | | |
|---|---|---|---|---|
| 2020/0399863 | A1 | 12/2020 | Aizawa et al. | |
| 2022/0412054 | A1 * | 12/2022 | Takeo | E02F 9/205 |
| 2024/0051405 | A1 * | 2/2024 | Morishita | B60L 50/53 |

FOREIGN PATENT DOCUMENTS

| | | | | |
|---|---|---|---|---|
| JP | 6267629 | B2 * | 1/2018 | Y02B 70/30 |
| WO | 2019/172424 | A1 | 9/2019 | |

* cited by examiner

ACTUAL MACHINE MANAGEMENT DEVICE, AND ACTUAL MACHINE MANAGEMENT SYSTEM

TECHNICAL FIELD

The present invention relates to an actual machine management device that manages a plurality of work machines to be remotely operated, and an actual machine management system including an actual machine management device, and particularly to an actual machine management device and an actual machine management system that can appropriately manage the remaining amount of power storage of a power storage device of a work machine on standby.

BACKGROUND ART

In recent years, inventions have made that relate to a remote operation device configured to remotely operate a work machine. In such a remote operation device, an operator remotely operates the work machine at a location away from the work machine while viewing images of surroundings transmitted from the work machine. In addition to the images of the surroundings of the work machine, the work machine also transmits information related to the work machine, for example, information regarding an operating status of an engine mounted on the work machine, to the remote operation device. The operator operates the work machine while recognizing such information. In addition, the work machine is mounted with a power storage device. Since the power storage device supplies power to various electronic devices as well as a starter motor for starting the engine and an engine control device, it is necessary to maintain the remaining amount of power storage of the power storage device to be a certain level or higher. Patent Literature 1 discloses a management device that manages the remaining amount of power storage of a work machine for construction work.

Furthermore, when a plurality of work machines are remotely operated, the work progresses while switching between the work machines to be operated, one work machine being remotely operated and the other work machine being placed on standby. In order to make the work machine on standby capable of starting work immediately after it receives a work command, electronic devices including control devices are kept in a standby state in a state of being powered up.

CITATION LIST

Patent Literature

Patent Literature 1: Japanese Patent Laid-Open No. 2016-111808

SUMMARY OF INVENTION

Technical Problem

However, when the electronic devices continue to be powered up, the power is gradually consumed, and the remaining amount of power storage of the power storage device decreases, which may fall below a required predetermined level. In particular, when a plurality of work machines are remotely operated, the operator may become distracted by the operation of the work machine being working on and may not notice the remaining amount of power storage of the work machine on standby. If such a state continues, there has been a problem that the remaining amount of power storage may decrease below a predetermined level without a user's notice, the engine may no longer start, and charging may be required. Patent Literature 1 discloses the invention related to management of the remaining amount of power storage, but does not disclose a case where a plurality of work machines are remotely operated, whereby there has been still a problem of not grasping occurrence of a decrease in the power storage amount of the power storage device of the standby work machine when the plurality of work machines are remotely operated.

The present invention has been made to solve the above problems, and according to the present invention, even when a plurality of work machines are remotely operated, it is possible to know the remaining amount of power storage of the each of the standby work machines, and to appropriately manage the power storage amount of the power storage device.

Solution to Problem

An actual machine management device of the present invention is configured to manage a plurality of work machines to be remotely operated, each work machine including a power storage device and a communication device capable of transmitting power storage information regarding the remaining amount of power storage of the power storage device, the actual machine management device being configured to, based on the power storage information transmitted from each of the communication devices of the standby work machines that are in a standby state and are not actuated by remote operation among the plurality of work machines, transmit the power storage information to notification devices at timing of notification about the remaining amount of power storage of the power storage devices, the timing being a time when for each of the standby work machines the remaining amount of power storage of the power storage device reaches a predefined power storage threshold or is estimated to reach the predefined power storage threshold.

DESCRIPTION OF EMBODIMENTS

First Embodiment

[Configuration of Actual Machine Management System 100]

Figure 1:
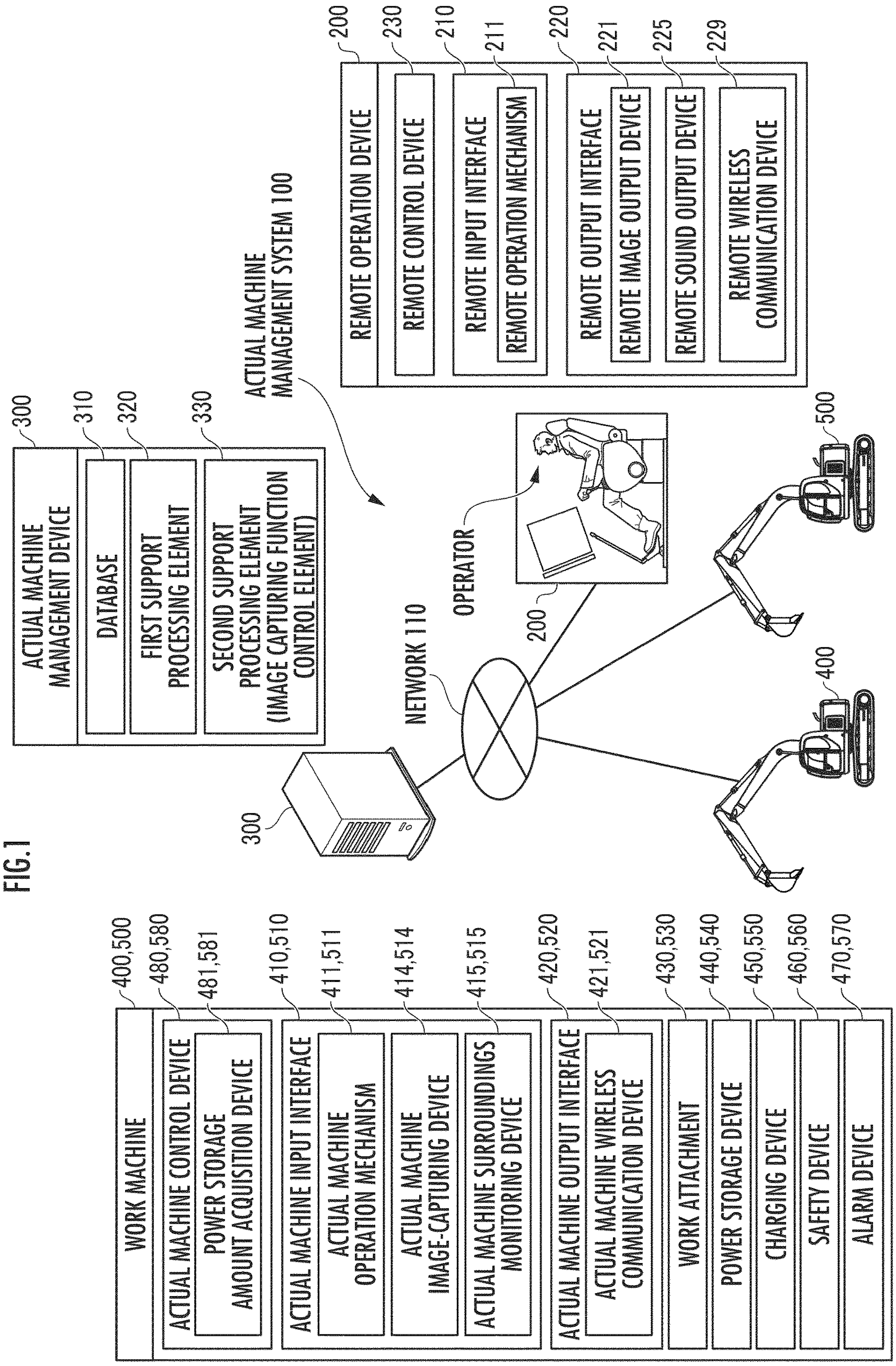
FIG. 1 is a schematic diagram showing an actual machine management system according to a first embodiment.

An actual machine management system 100 will be described with reference to FIG. 1. The actual machine management system 100 includes a remote operation device 200, an actual machine management device 300, and one or more work machines 400 and 500 that can be remotely operated through the remote operation device 200. The number of work machines 400 and 500 to be remotely operated may be two or three or more. Further, the present invention can also be applied to individual work machines as long as the work machine 400 is in a standby state for a certain amount of time. Only one of the remote operation device 200 and the work machines 400 and 500 may be a component of the actual machine management system 100.

The remote operation device 200, the actual machine management device 300, and the work machines 400 and 500 are configured to be able to communicate with each other via a network 110. A network used to perform mutual communication between the remote operation device 200 and the actual machine management device 300 and a network used to perform mutual communication between the actual machine management device 300 and the work machines 400 and 500 may be the same system or may be different systems. In addition, the network 110 may be included as a system peculiar to the actual machine management system 100, or may use an existing network system.

[Configuration of Actual Machine Management Device 300]

The actual machine management device 300 includes a database 310, a first support processing element 320, and a second support processing element 330. The actual machine management device 300 may be configured from a support server that supports the actual machine management system. The database 310 stores and retains power storage information, captured image data, and the like of the work machines 400 and 500. The database 310 may be configured by a database server separate from the actual machine management device 300. Each of the support processing elements 320 and 330 is configured by an arithmetic processing device, for example, a single-core processor, a multi-core processor, or a processor core constituting such a processor, reads necessary data and software from a storage device such as a memory, and executes arithmetic processing on the data according to the software.

[Configuration of Remote Operation Device 200]

The remote operation device 200 includes a remote control device 230, a remote input interface 210, and a remote output interface 220 which are not shown. The remote control device 230 is configured by an arithmetic processing device, for example, a single-core processor, a multi-core processor, or a processor core constituting such a processor, reads necessary data and software from a storage device such as a memory, and executes arithmetic processing on the data according to the software.

The remote input interface 210 includes a remote operation mechanism 211. The remote output interface 220 includes a remote image output device 221, a remote sound output device 225, and a remote wireless communication device 229.

The remote operation mechanism 211 will be described with reference to FIG. 2. The remote operation mechanism 211 includes a traveling operation device, a turning operation device, a boom operation device, an arm operation device, and a bucket operation device. Each of the operation devices has an operation lever subjected to a rotating operation. An operation lever (traveling lever) of the traveling operation device is operated so as to move a lower traveling body of each of the work machines 400 and 500. The traveling lever may also serve as a traveling pedal. For example, a traveling pedal may also be provided that is fixed to a base or a lower end of the traveling lever. An operation lever (turning lever) of the turning operation device is operated so as to move a hydraulic turning motor constituting a turning mechanism of each of the work machines 400 and 500.

An operation lever (boom lever) of the boom operation device is operated so as to move a boom cylinder of each of the work machines 400 and 500. An operation lever (arm lever) of the arm operation device is operated so as to move an arm cylinder of each of the work machines 400 and 500. An operation lever (bucket lever) of the bucket operation device is operated so as to move a bucket cylinder of each of the work machines 400 and 500.

Figure 2:
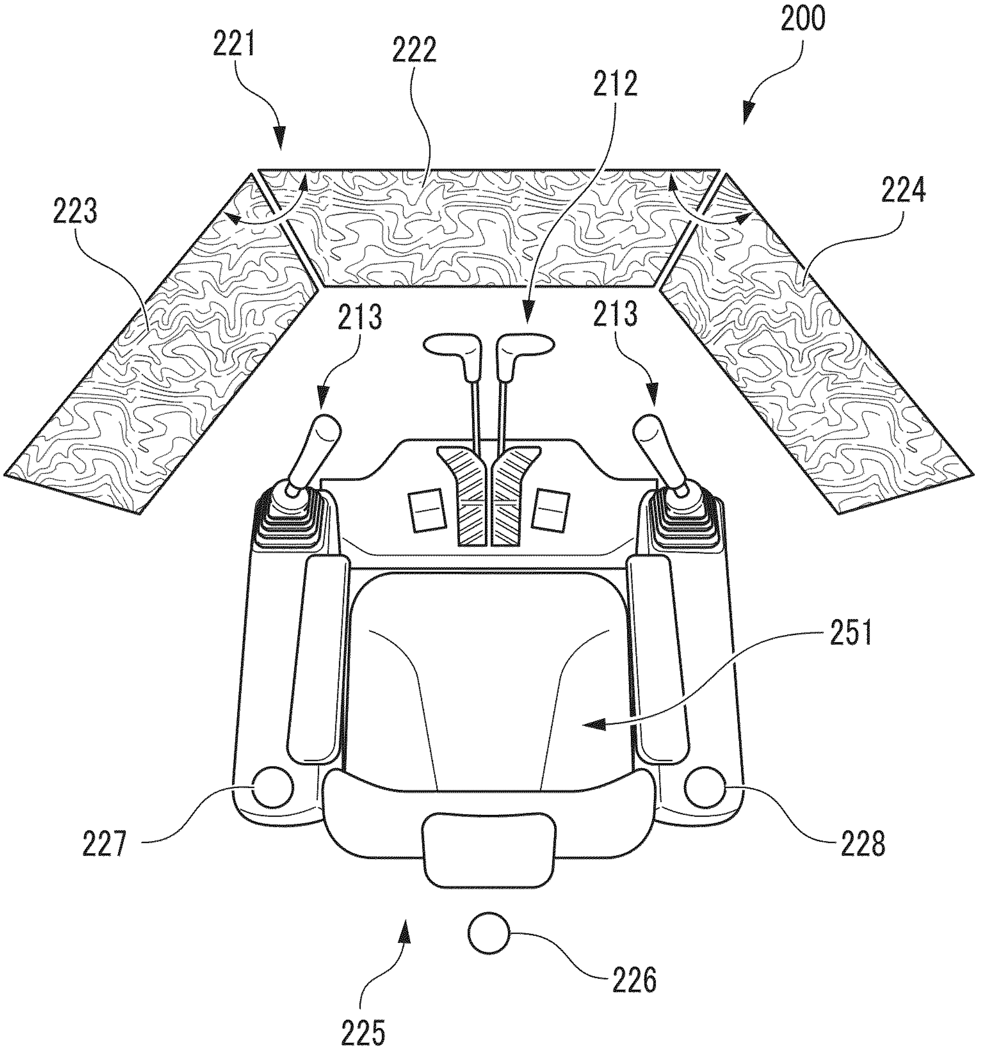
FIG. 2 is a schematic diagram showing a remote operation device shown in FIG. 1.

The respective operation levers constituting the remote operation mechanism 211 are arranged around a seat 251 on which an operator is seated, as shown in FIG. 2, for example. The seat 251 is in a form of a high back chair with armrests. Alternatively, the seat 251 may be in any form, on which the operator can sit, such as a low back chair without a headrest or a chair without a backrest.

In front of the seat 251, a pair of left and right traveling levers 212 respectively corresponding to left and right crawlers of the lower traveling body are arranged side by side in left and right. The traveling levers 212 may be configured to be served as a plurality of operation levers by one operation lever. Further, on left and rights sides of the seat 251, the operation levers 213 and 213 are arranged respectively to function as a turning operation device for the upper turning body of each of the work machines 400 and 500, a boom operation device, an arm operation device, and a bucket operation device.

The remote image output device 221 includes a central remote image output device 222, a left remote image output device 223, and a right remote image output device 224, which have substantially a rectangular screen and are arranged in front, in diagonally left front, and in diagonally right front of the seat 251, respectively, as shown in FIG. 2, for example. Each of the central remote image output device 222, the left remote image output device 223, and the right remote image output device 224 has a screen (image display region) of the same shape and size. Alternatively, the central remote image output device 222 may be larger than the other devices, and the left remote image output device 223 and the right remote image output device 224 may be smaller than the central remote image output device 222.

As shown in FIG. 2, a right edge of the left remote image output device 223 is adjacent to a left edge of the central remote image output device 222 such that the screen of the central remote image output device 222 and the screen of the left remote image output device 223 form an inclination angle $\theta 1$ (for example, $120° \leq \theta 1 \leq 150°$). As shown in FIG. 2, a left edge of the right remote image output device 224 is adjacent to a right edge of the central remote image output device 222 such that the screen of the central remote image output device 222 and the screen of the right remote image output device 224 form an inclination angle $\theta 2$ (for example, $120° \leq \theta 2 \leq 150°$). The inclination angles $\theta 1$ and $\theta 2$ are equal to each other. Alternatively, the inclination angles $\theta 1$ and $\theta 2$ may be different from each other.

The screen of each of the central remote image output device 222, the left remote image output device 223, and the right remote image output device 224 may be parallel in a vertical direction, or may be inclined in the vertical direction. At least one image output device of the central remote image output device 222, the left remote image output device 223, and the right remote image output device 224 may be configured by a plurality of divided image output devices. For example, the central remote image output device 222 may be configured by a pair of image output devices having substantially a rectangular screen and adjacent to each other in an up and down direction.

The remote sound output device 225 is configured by one or a plurality of speakers, and includes a central sound output device 226, a left sound output device 227, and a right sound output device 228, which are arrange in back of the seat 251, at a rear part of the left armrest, and at a rear part of the right armrest, respectively, as shown in FIG. 2, for example. The central sound output device 226, the left sound output device 227, and the right sound output device 228 are equal to each other. Alternatively, each of the central sound output device 226, the left sound output device 227, and the right sound output device 228 may be a sound output device having different sizes or characteristics.

[Configuration of Work Machine 400, 500]

The work machines 400 and 500 are work machines 400 and 500 that are operated by a remote operation at a construction site. The type, size, and number of work machines 400 and 500 to be used are appropriately selected depending on the content of work, the scale of work, and the like. In FIG. 1, a case is shown in which two work machines 400 and 500 are used. The two work machines 400 and 500 are alternately remotely operated by one operator according to the progress of the work. While one of the work machines 400 and 500 is in a working state, the other of the work machines 400 and 500 is in a standby state. The number of work machines 400 and 500 may be three or more, and while the work machine 400 is in a working state, the other work machines are in a standby state. The work machines 400 and 500 are driven by, for example, an internal combustion engine and a hybrid mechanism of an internal combustion engine and an electric motor, which are not shown.

Each of the work machines 400 and 500 is, for example, a crawler excavator which is a construction machine. As shown in FIG. 1, the crawler excavator includes a crawler-type lower traveling body and an upper turning body rotatably mounted on the lower traveling body via a turning mechanism. A cab, which is a driver's cabin, is provided on a front left side of the upper turning body. A work attachment is provided at a front center of the upper turning body. The work machines 400 and 500 include, respectively, actual machine input interfaces 410 and 510, actual machine output interfaces 420 and 520, work attachments 430 and 530, power storage devices 440 and 540, charging devices 450 and 550, safety devices 460 and 560, alarm devices 470 and 570, actual machine control devices 480 and 580 that control these components. When there are three or more work machines to be remotely operated, each of the work machines includes the above devices. The shape and arrangement of the devices arranged in each of the work machines 400 and 500 are not shown.

The actual machine input interfaces 410 and 510 include, respectively, actual machine operating mechanisms 411 and 511, actual machine image-capturing devices 414 and 514, and actual machine surroundings monitoring devices 415 and 515. Each of the actual machine operating mechanisms 411 and 511 includes a plurality of operation levers arranged around a seat arranged inside the cab in a manner similar to the remote operation mechanism 211. A drive mechanism or a robot is provided in the cab, which receives a signal according to the operation of the remote operation mechanism 211 and moves an actual machine operation lever based on the received signal. Each of the actual machine image-capturing devices 414 and 514 is installed, for example, inside the cab, and captures an image of a surrounding environment including at least a portion of each of the work attachments 430 and 530 through a front window and a pair of left and right side windows. A part or all of the window frames of the front window and the side windows may be outside an image-capturing range and not be appeared. Each of the actual machine surroundings monitoring devices 415 and 515 may be configured by a distance measurement sensor and the like configured to detect the presence of a target object (for example, a worker, another work machine, and/or a vehicle) in an actual space region (for example, a right region, a left region, and/or a rear region, and/or a dead angle region of the cab) outside the image-capturing range of each of the actual machine image-capturing devices 414 and 514.

The actual machine output interfaces 420 and 520 include actual machine wireless communication devices 421 and 521, which are communication devices, respectively. Each of the actual machine wireless communication devices 421 and 521 is connected to the remote operation device 200 and the actual machine management device 300 via the network 110, receives an actual machine operation signal, and also transmits the captured image of the surrounding environment and the power storage information of each of the power storage devices 440 and 540.

Each of the work attachments 430 and 530 includes a boom mounted on the upper turning body so as to rise and fall, an arm rotatably coupled to a tip of the boom, and a bucket rotatably coupled to a tip of the arm. Each of the work attachments 430 and 530 is mounted with a boom cylinder, an arm cylinder, and a bucket cylinder which are configured by an expandable hydraulic cylinder, respectively.

The boom cylinder is connected between the boom and the upper turning body so as to expand and contract with hydraulic oil being fed and rotate in a rising and falling direction. The arm cylinder is connected between the arm and the boom so as to expand and contract with hydraulic oil being fed and rotate the arm around a horizontal axis with respect to the boom. The bucket cylinder is connected between the bucket and the arm so as to expand and contract with hydraulic oil being fed and rotate the bucket around a horizontal axis with respect to the arm.

The power storage devices 440 and 540 are devices configured to feed power necessary for the work machines 400 and 500, respectively. When the work machines 400 and 500 under the control of remote operation are not in the middle of work but in a standby state, power is fed from the power storage devices 440 and 540 to the actual machine wireless communication devices 421 and 521, the actual machine control devices 480 and 580, and others. Each of the power storage devices 440 and 540 is a battery, for example.

The charging devices 450 and 550 are devices that charge the power storage devices 440 and 540, respectively, when the remaining amount of power stored in the power storage devices 440 and 540 becomes a predetermined value or less. The charging devices 450 and 550 are, for example, generators driven by internal combustion engines included in the work machines 400 and 500, respectively.

The safety devices 460 and 560 are devices that lock at least one operation lever, including a traveling lever, of the work machines 400 and 500 to be in a non-operation state, respectively. When charging is started by a remote operation without a passenger on the work machines 400 and 500, the safety devices 460 and 560 are actuated prior to the start of charging and lock the operation lever at non-traveling positions of the work machines 400 and 500 or non-operation positions of the work attachments 430 and 530, respectively. By locking of the operation levers at the above-described position, it is possible to prevent the work machines 400 and 500 or the work attachments 430 and 530 from suddenly starting to move when the internal combustion engines of the work machines 400 and 500 are activated.

The alarm devices 470 and 570 are devices that are actuated prior to the start of charging and notify surroundings of the start of charging when the work machines 400 and 500 start charging under the control of remote operation. The alarm devices 470 and 570 are devices that prevent surrounding persons from surprising to try to get in the work machines 400 and 500 in a hurry to stop when the internal combustion engines of the unmanned work machines 400 and 500 starts to move in response to a command signal during the start of charging by the remote operation.

The actual machine control devices 480 and 580 are devices that control the devices provided in the work machines 400 and 500, respectively. The actual machine control devices 480 and 580 include power storage amount acquisition devices 481 and 581 configured to detect the power storage amount of the power storage devices 440 and 540, respectively. The power storage amount acquisition devices 481 and 581 detect the power storage amounts of the power storage devices 440 and 540 of the work machines 400 and 500 under a predetermined condition and transmit power storage information to the actual machine wireless communication devices 421 and 521, respectively.

[Flow for Remotely Operating Plurality of Work Machines 400 and 500]

Figure 3:
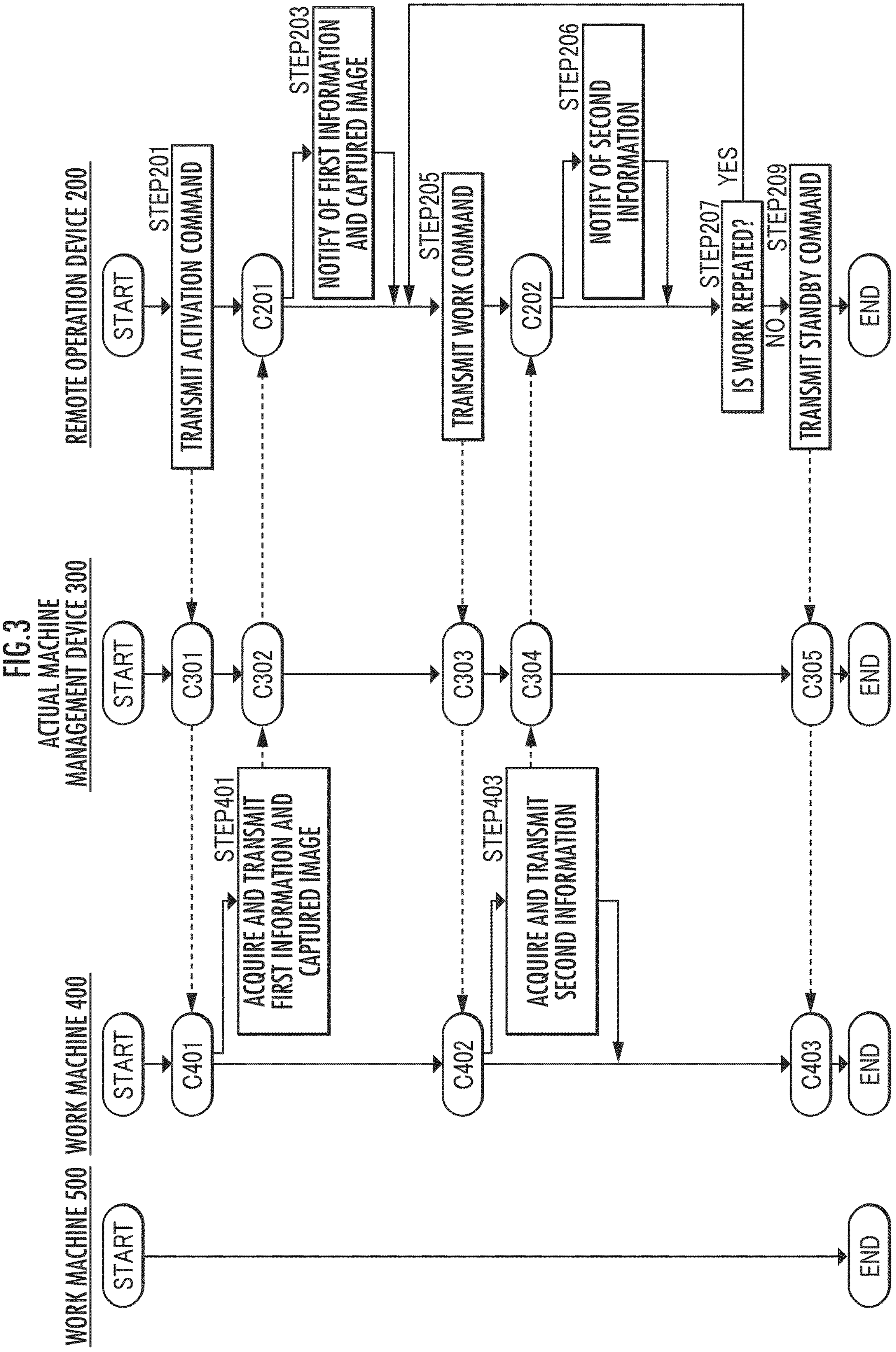
FIG. 3 is a flowchart showing a flow of remote operation in the actual machine management system shown in FIG. 1.
Figure 4:
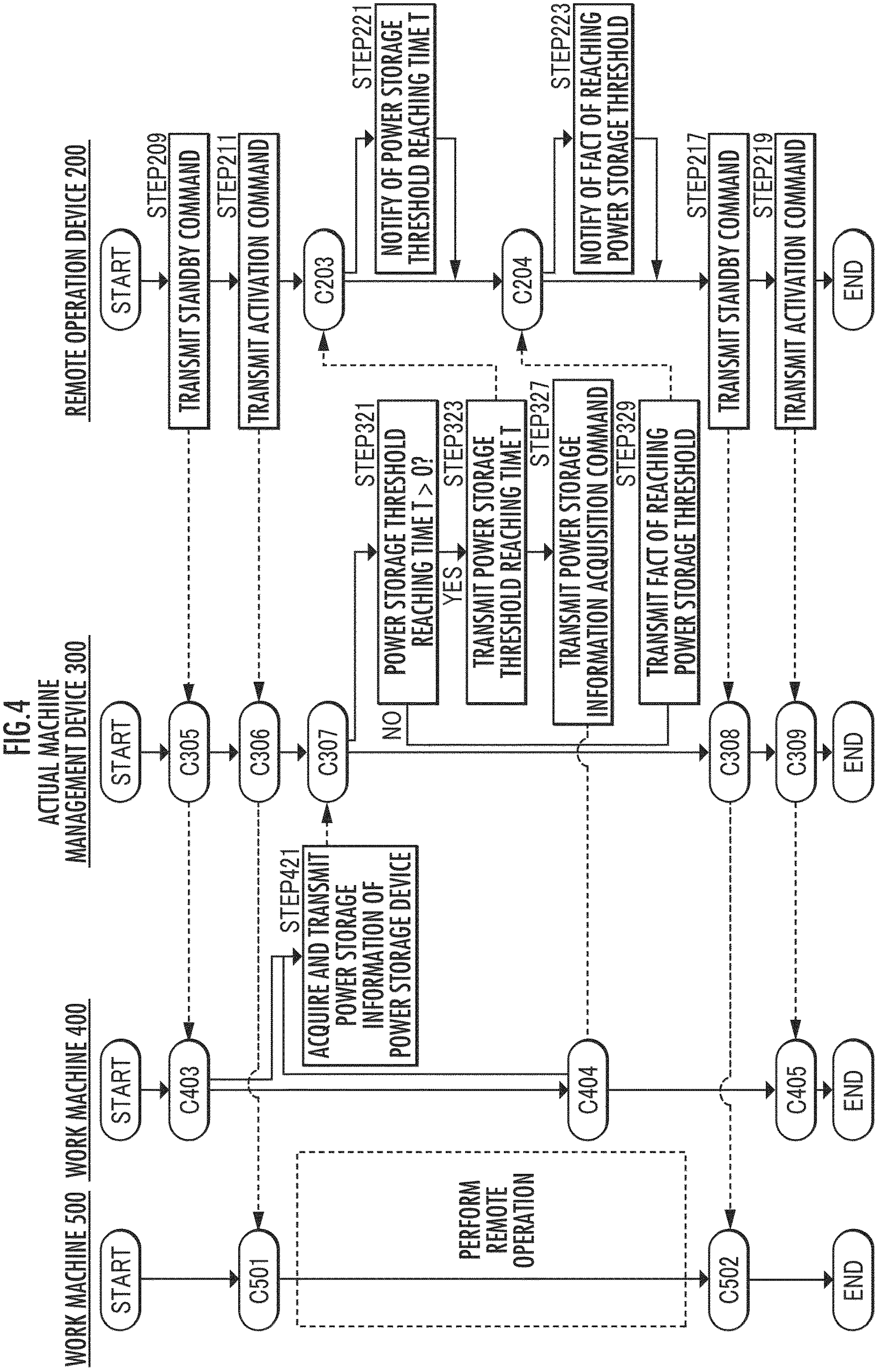
FIG. 4 is a flowchart showing a management process of the remaining amount of power storage according to first and second embodiments of a work machine on standby in the actual machine management system shown in FIG. 1.

A description will be given with reference to FIGS. 3 and 4 with respect to a flow for remotely operating the plurality of work machines 400 and 500 according to the first embodiment. The first embodiment includes a process of notifying the remaining amount of power storage of the work machine 400 on standby. Based on the notified information, the operator switches a work target to the work machine 400 and charges the work machine 400 while working until the remaining amount of power storage of the work machine 400 falls to a predetermined value. FIG. 3 is a flowchart showing a flow for remotely operating a first work machine 400 among a plurality of work machines 400 and 500. FIG. 4 is a flowchart showing a process of starting a remote operation with a second work machine 500 instead of the first work machine 400 shown in FIG. 3 and managing the remaining amount of power storage of the power storage device 440 of the first work machine 400 being in a standby state.

In flowcharts of FIGS. 3 to 6, blocks such as "C201", "C301", and "C401" refer to conditional branches where data transmission and/or reception and processing in a branch direction is executed on the condition of the data transmission and/or reception.

A main switch of the work machine 400 is turned on to start a remote operation, and is set to a standby state (STEP 100).

Although not shown in FIG. 3, such a step described above is a task that should be performed before the start of the remote operation. The work machine 400 to be remotely operated is set to a standby state, in which a remote operation is possible, by manually turning on a main switch provided therein. In the work machine 400, the standby state is a state in which the internal combustion engine for driving the work machine 400 has not been started up and the actual machine wireless communication device 421 and the actual machine control device 480 including the power storage amount acquisition device 481 are powered up, thereby capable of receiving a command from the remote operation device 200. It is possible to start up the internal combustion engine of the work machine 400 to start work by transmission of an activation command from the remote operation device 200 to the work machine 400 being in the standby state.

In a case of remotely operating the plurality of work machines 400 and 500, it is possible to turn on main switches of both the work machines 400 and 500 at the same time and thus to set the work machines 400 and 500 to a standby state. On the other hand, at a time point of the start of work of the work machine 400 to be used as a first machine starts work, only the first machine is set to a standby state, and the main switch of the second work machine 500 may be turned on immediately before the second work machine 500 starts work. This can make it possible to contribute to power saving of the power storage device 540 of the second work machine 500. The main switch may be turned on by making a worker going to a work site where each of the work machines 400 and 500 is located, rather than an operator who operates the remote operation device 200 located in a remote location.

In response to operation of the operator, the remote operation device 200 transmits an activation command to the actual machine management device 300 through the remote wireless communication device 229 (STEP 201). The activation command is received by the actual machine management device 300 (C301). In response, the work machine 400 receives the activation command transmitted from the actual machine management device 300 (C401).

When the internal combustion engine of the work machine 400 is started after receiving the activation command, the actual machine control device 480 of the work machine 400 starts self-diagnosis regarding a vehicle state (STEP 401). The work machine 400 acquires first information including a result of the self-diagnosis and captured images of the actual machine image-capturing device 414 and the actual machine surroundings monitoring device 415, and transmits the acquired information and captured images to the actual machine management device 300. The first information and the captured images above are received by the actual machine management device 300 (C302). In response, the first information and the captured images are transmitted and received to/by the remote operation device 200 (C201). The self-diagnosis refers to predetermined checks at the time of the start of work performed immediately after the start of the internal combustion engine, the predetermined checks including a check of startup of the internal combustion engine, a check of oil pressure of the internal combustion engine, a check of remaining fuel level, a check of actuation during activating of an electronic device such as the actual machine operating mechanism 411, and a check of power storage of the power storage device 440. The first information indicates various items of the self-diagnosis. The first information and the captured image are transmitted immediately after the work machine 400 is activated, and are continuously transmitted thereafter.

The remote operation device 200 notifies of the received first information and the captured images above using the remote image output device 221 and/or remote sound output device 225 (STEP 203). The operator uses the information to check the presence or absence of abnormality of the work machine 400 and to check detailed information such as the remaining amount of power storage of the power storage device 440.

When the work machine 400 is activated without any abnormality, the remote operation device 200 transmits a work command to the actual machine management device 300 by the operation of the operator (STEP 205). The work command is received by the actual machine management device 300 (C303). In response, the work command is transmitted to and received by the work machine 400 (C402).

When receiving the work command, the work machine 400 transmits second information to the actual machine management device 300 (STEP 403). The second information is a reception confirmation signal transmitted from the work machine 400 when the work command is received. Further, when a drive amount detection device is mounted on the actual machine operating mechanism 411 of the work machine 400, the second information can include a detection value of the drive amount or a drive confirmation signal indicating that the actual machine operating mechanism 411 is actually driven. The transmitted second information is received by the actual machine management device 300 (C304). In response, the remote operation device 200 receives the second information transmitted from the actual machine management device 300 (C202).

The second information received by the remote operation device 200 is notified by the remote image output device 221 and/or the remote sound output device 225, and is confirmed by the operator (STEP 206).

When the work machine 400 continues to work after performing the work according to the transmitted work command, the operator transmits the next work command (STEP 207). Each process from STEP 205 to STEP 207 is repeated until the scheduled work is completed.

When a scheduled section of work on the work machine 400 is completed, or when the work on the work machine 400 is interrupted for some reason and placed in a standby state, the remote operation device 200 transmits a standby command to the actual machine management device 300 according to the operation of the operator (STEP 209). The standby command is received by the actual machine management device 300 (C305). In response, the standby command is transmitted from the actual machine management device 300 and received by the work machine 400 (C403). Thus, the work machine 400 becomes a standby state.

Next, a description will be given with reference to FIG. 4 with respect to switching of the work target to be remotely operated by the remote operation device 200 from the work machine 400 into the work machine 500 and a remaining power storage amount management process 1 of the power storage device 440 of the work machine 400 being in the standby state after the switching. The remaining power storage amount management process 1 is a process of constantly transmitting the remaining amount of power storage of the power storage device 440 from the work machine 400 to the actual machine management device 300. In order to switch to the work machine 500, the main switch of the work machine 500 to be used is set to a standby state in advance, similar to STEP 100 above. Hereafter, the remote operation device 200 transmits the activation command to the actual machine management device 300 in STEP 211. The activation command is received by the actual machine management device 300 (C306). In response, the activation command is transmitted from the actual machine management device 300 and received by the work machine 500 (C501). By the operation above, the work machine 500 is activated, and the work machine 500 becomes a work possible state. Subsequently, when the work machines 400 and 500 are switched, the work machines 400 and 500 being working on are set to a standby state by the remote operation, the operation of activating the work machines 400 and 500 on standby is repeated, and the work is performed using the selected work machines 400 and 500.

The work machine 400, which has received the standby command, stops the internal combustion engine, acquires the power storage information of the power storage device 440, and transmits the acquired power storage information to the actual machine management device 300 (STEP 421). In response, the actual machine management device 300 receives the power storage information (C307).

The work machine 400 placed in the standby state by the standby command is in a state where the internal combustion engine is stopped. In addition, the actual machine wireless communication device 421 and the actual machine control device 480 including the power storage amount acquisition device 481 are constantly powered up, and can receive commands from the remote operation device 200. The power storage amount acquisition device 481 powered up constantly detects the power storage amount of the power storage device 440. The power storage amount of the power storage device 440 is a voltage value between connection terminals of the power storage device 440. Further, the power storage information indicates a value corresponding to a voltage between the connection terminals of the power storage device 440.

The actual machine management device 300 calculates, using the acquired power storage information, a power storage threshold reaching time T, which is a time until the power storage amount decreases and reaches a power storage threshold from a time when the power storage information is acquired. Here, the power storage threshold is a value obtained by adding a margin value to a limit power storage threshold, which is a limit value of the power storage amount that can start up the internal combustion engine of the work machine 400. Then, it is determined whether the power storage amount of the power storage device 440 has not yet reached the power storage threshold, that is, whether the power storage threshold reaching time T is greater than 0 (STEP 321). The actual machine management device 300 stores the power storage threshold for each work machine 400 and a power consumption value per hour in the standby state, and based on them and the acquired power storage information, calculates the power storage threshold reaching time T. The power storage threshold reaching time T required to reach the power storage threshold for each power storage device 440 varies depending on influence factors, for example, an air temperature and a cumulative use time of the power storage device 440. Therefore, states of these influence factors may be detected by detectors provided, or the cumulative use time of the power storage device 440 of the work machine 400 stored in the actual machine management device 300 may be calculated, the power storage threshold reaching time T may be corrected based on an association table between the influence factors and the power storage threshold reaching time T stored in the actual machine management device 300, and the corrected power storage threshold reaching time T may be determined.

When the power storage threshold reaching time T has not yet reached the power storage threshold as a result of calculation in STEP 321, that is, when the power storage threshold reaching time T is greater than 0, the actual machine management device 300 transmits the calculated power storage threshold reaching time T to the remote operation device 200 (STEP 323). In response, the remote operation device 200 receives the transmitted power storage threshold reaching time T (C203).

The remote operation device 200 notifies the operator of information regarding the received power storage threshold reaching time T (STEP 221). The notification device includes the remote image output device 221 and the remote sound output device 225 of the remote operation device 200, and uses at least one of them to notify the operator. The remote image output device 221 displays, according to the received power storage threshold reaching time T, at least one of the period until the power storage device 440 reaches the power storage threshold and the time at which the power storage device 440 reaches the power storage threshold, on a screen of the remote image output device 221. Further, the remote image output device 221 generates a voice or a sound message corresponding to at least one of the period and the time described above.

The actual machine management device 300 can simultaneously output the power storage information of each of two or more work machines 400 and 500, including at least standby work machine, among the plurality of work machines 400 and 500 being remotely operated to the notification device, that is, the remote image output device 221 and/or the remote sound output device 225. Further even when there are three or more work machines being remotely operated, the power storage information for each work machine can be output simultaneously. The power storage information is displayed on the remote image output device 221 as one or more numbers, figures, or a combination thereof. In addition, the remote sound output device 225 outputs a voice and/or a sound other than the voice that is associated with the power storage information. The notification from the remote image output device 221 and/or the remote sound output device 225 can include one or more of specific information of the work machines 400 and 500, for example, model names, management numbers, and names of all of the work machines 400 and 500 remotely operated by the remote operation device 200, and states of the work machines 400 and 500, for example, during working, during standby, and during charging.

Further, the power storage information to be output to the remote image output device 221 by the actual machine management device 300 includes an icon having a figure, and an icon indicating the power storage information of each of the work machines 400 and 500 that has become equal to or less than the power storage threshold may be displayed with a time change in icon display for at least a part of the icon. The icon includes, for example, a polygon such as a triangle or a rectangle, a circle including an oblong ellipse, a straight line, a pattern display of a region including a part of a constant area region, and a combination thereof. At least a portion or at least a plurality of portions thereof may change over time, for example, blinking, change in shape, and change in color. These changes may be configured such that the change occurs in the other state relative to each of two states indicating whether the remaining amount of power storage has reached the power storage threshold or has not yet. Alternatively, it may be configured to change continuously depending on the continuous change in the remaining amount of power storage. When the power storage information is notified by the icon display or the sound, it will be easier to understand compared to a case of being notified by numbers, and be easier to recognize the notified information while working.

Further, the notification device includes, for example, a mobile terminal such as a smartphone or a tablet in addition to the remote operation device 200. The actual machine management device 300 transmits the power storage threshold reaching time T to the mobile terminal to notify the owner of the mobile terminal, in addition to the remote operation device 200 or instead of the remote operation device 200.

After STEP 323, the remote operation device 200 transmits a power storage information acquisition command to the work machine 400 (STEP 327). In response, the work machine 400 receives the power storage information acquisition command (C404). Returning to STEP 421, the work machine 400, which has received the power storage information acquisition command, acquires the power storage information of the power storage device 440, and transmits the acquired power storage information to the actual machine management device 300. The actual machine management device 300 acquires new power storage information, and the power storage information is repeatedly notified to the operator in STEPs 321, 323, and 221, described above. Since the power storage information of the work machine 400 on standby can be constantly acquired, accurate power storage information can be notified to the operator.

When the remaining amount of power storage of the power storage device 440 has reached the power storage threshold, the actual machine management device 300 transmits to the remote operation device 200 that the power storage threshold has been reached (STEP 329). In response, the remote operation device 200 receives that the power storage threshold has been reached (C204).

The remote operation device 200 uses the notification device to notify the operator of the fact that the remaining amount of power storage of the power storage device 440 has reached the power storage threshold (STEP 223).

After being notified of the remaining amount of power storage in STEP 223, the remote operation device 200 transmits the standby command for the work machine 500 to the actual machine management device 300 in response to the operation of the operator (STEP 217), and the standby command is received by the actual machine management device 300 (C308). In response, the standby command is transmitted from the actual machine management device 300, and the work machine 500 receives the standby command (C502). Thereby, the work machine 500 being working on is placed in a standby state.

In response to the operation of the operator, the remote operation device 200 transmits the activation command for activating the work machine 400 to the actual machine management device 300 (STEP 219), and the activation command is received by the actual machine management device 300 (C309). In response, the activation command is transmitted from the actual machine management device 300, and the work machine 400 receives the activation command (C405), whereby the work machine 400 starts up the internal combustion engine (STEP 219). As the internal combustion engine of the work machine 400 starts up, the charging device 450 actuates, and charging of the power storage device 440 is started. As described above, the work machine 500 being working on is placed in the standby state, and the work machine 400 is activated and charged whose remaining amount of power storage of the power storage device 440 has reached the power storage threshold, whereby it is possible to manage the remaining amount of power storage of the power storage device 440 of the work machine 400 so as to always maintain to be the power storage threshold or more.

A notification timing of the remaining amount of power storage of the power storage device is a time when the predefined power storage threshold for each standby work machine is reached, or when the predefined power storage threshold is estimated to be reached. Alternatively, the notification may be performed within a predetermined time range with respect to such a time. The notification may be performed before the power storage threshold is reached or at a predetermined time before the power storage threshold is estimated to be reached. For example, the notification may be performed in advance before the power storage threshold is reached, or 5 minutes, 10 minutes, or 15 minutes before the power storage threshold is estimated to be reached. Thus, it is possible to prevent the operator from being forced to make sudden changes in work.

When it is not necessary to switch the work target to be remotely operated by the remote operation device 200 to the work machine 500, the transmission of the standby command (STEP 217) and the transmission of the activation command (STEP 219) are not performed. In this case, the work machine 400 may transmit the power storage information to the remote operation device 200 via the actual machine management device 300 at a point of time when the power storage amount of the power storage device 440 decreases and reaches the limit power storage threshold, and may notify, using the notification device of the remote operation device 200, of the fact that the remaining amount of power storage of the power storage device 440 has reached the limit power storage threshold. Further, the work machine 400 may stop the application of current to the actual machine control device 480 at the point of time when the power storage amount of the power storage device 440 decreases and reaches the limit power storage threshold, thereby preventing the decrease in the power storage amount of the power storage device 440.

Second Embodiment

Next, a remaining power storage amount management process 2 according to a second embodiment will be described. In the first embodiment, the actual machine wireless communication device 421 and the actual machine control device 480 including the power storage amount acquisition device 481 are constantly powered up, the power storage amount acquisition device 481 detects the power storage amount of the power storage device 440 and always transmits the power storage information to the actual machine management device 300. In contrast, the second embodiment is different from the first embodiment only in that only the actual machine wireless communication device 421 is powered up and the actual machine control device 480 including the power storage amount acquisition device 481 is intermittently powered up.

In the remaining power storage amount management process 2 according to the second embodiment, the power storage information acquisition command is intermittently transmitted to the work machine 400 from the actual machine management device 300 (STEP 327). The actual machine management device 300 periodically transmits the power storage information acquisition command at arbitrary time intervals, for example, every 30 minutes, every one hour, every two hours, or every three hours. When the work machine 400 receives the power storage information acquisition command, the actual machine wireless communication device 421 causes the power storage amount acquisition device 481 to be powered up. The power storage amount acquisition device 481 detects the power storage amount of the power storage device 440 every power-up, and transmits the power storage information to the actual machine management device 300, similarly to STEP 421. Hereafter, the above steps are repeated. With such a configuration, the power consumption can be reduced and thus the standby time of the power storage device 440 can be lengthened compared to a case where the power storage amount acquisition device 481 is constantly powered up. As an alternative to the method of periodically acquiring the power storage information of the power storage device 440, a configuration may be provided in which the actual machine wireless communication device 421 or the actual machine control device 480 is provided with a timer circuit and the power storage information of the power storage device 440 is periodically transmitted from the work machine 400 instead of the periodic command from the actual machine management device 300.

Third Embodiment

A remaining power storage amount management process 3 according to a third embodiment will be described with reference to FIG. 5. In the remaining power storage amount management process 1 according to the first embodiment, the actual machine wireless communication device 421 and the actual machine control device 480 including the power storage amount acquisition device 481 are constantly powered up, the power storage amount acquisition device 481 detects the power storage amount of the power storage device 440 and always transmits the power storage information to the actual machine management device 300. In contrast, according to the third embodiment, the power is constantly supplied only to the actual machine wireless communication device 421 that receives the remote operation command. The power storage amount management process 3 of the third embodiment is different from that of the first embodiment in terms of this point. The power storage amount acquisition device 481 detects the power storage amount of the power storage device 440 at the point of time of entering the standby state, and the application of current to the power storage amount acquisition device 481 is cut off when the power storage information is transmitted to the actual machine management device 300. Hereafter, the power storage threshold reaching time T is periodically notified to the remote operation device 200 based on the power storage information received at the point of time when the actual machine management device 300 enters the standby state.

Figure 5:
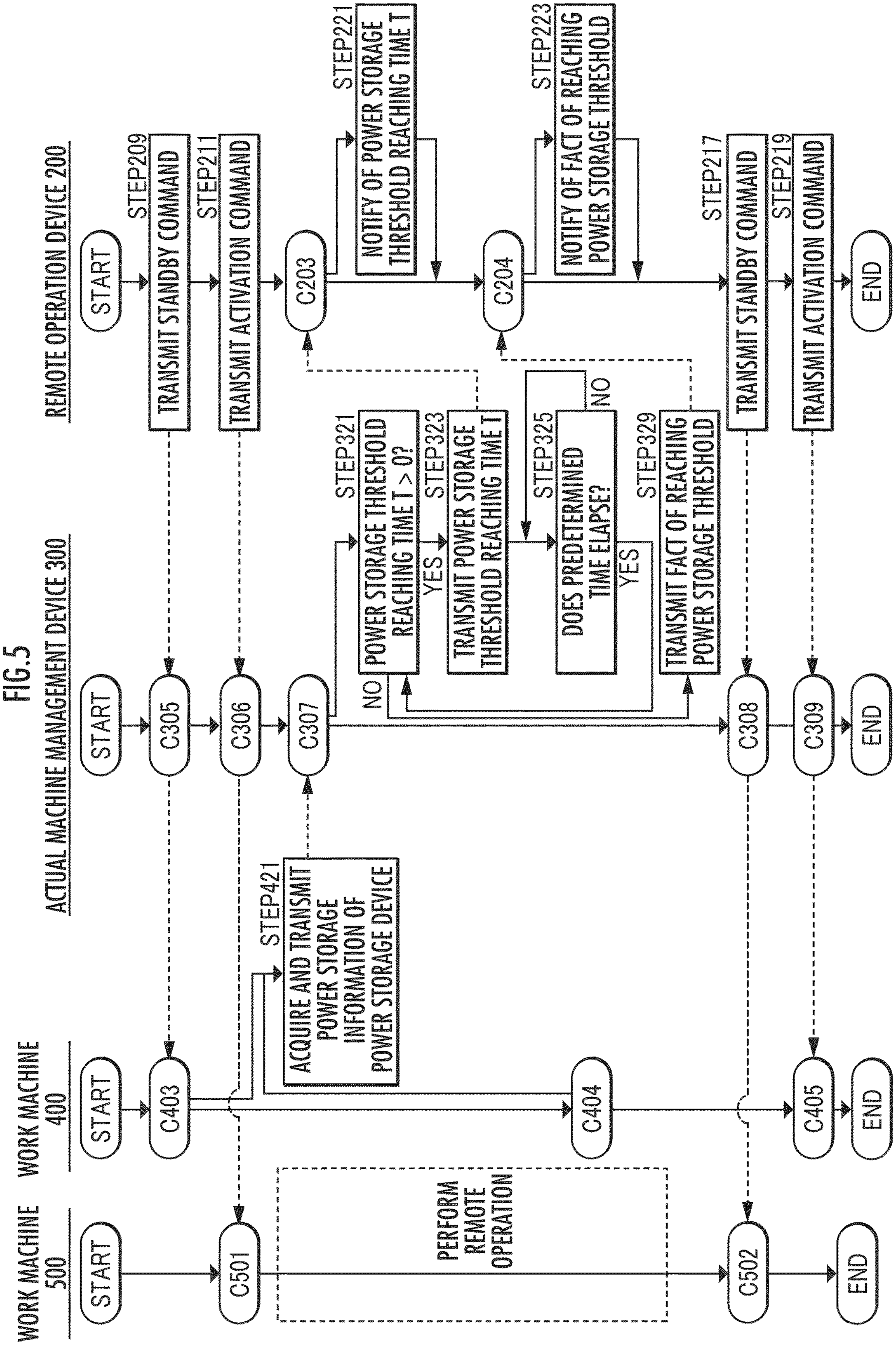
FIG. 5 is a flowchart showing a management process of the remaining amount of power storage according to a third embodiment of a work machine on standby in the actual machine management system shown in FIG. 1.

In FIG. 5, each STEPs 321 and 323 is performed similarly to the first and second embodiments. After the power storage threshold reaching time T is calculated, transmitted to the remote operation device 200, and notified to the operator, these steps are repeatedly performed.

After transmitting the power storage threshold reaching time T to the remote operation device 200, the actual machine management device 300 waits until a predetermined time elapses (STEP 325).

The actual machine management device 300 recalculates the power storage threshold reaching time T when the time elapses from the previous calculation (STEP 321).

Hereafter, each of STEPs 323, 221, and 325 is repeated until the remaining amount of power storage of the power storage device 440 reaches the power storage threshold.

Further, after the remaining amount of power storage of the power storage device 440 reaches the power storage threshold, the process proceeds to STEP 329, and each STEPs 223, 217, and 219 is performed similarly to the first embodiment. In the remaining power storage amount management process 3 of the third embodiment, since the power is constantly supplied only to the actual machine wireless communication device 421 that receives the remote operation command, the power consumption can be reduced and the standby time of the power storage device 440 can be lengthened compared to the first and second embodiments.

Fourth Embodiment

A fourth embodiment will be described with reference to FIG. 6. In the first embodiment, when the remaining amount of power storage of the power storage device 440 reaches the power storage threshold, the operator transmits the activation command to the work machine 400 on standby, activates the work machine 400 on standby to start up the internal combustion engine, and charges the power storage device 440 of the work machine 400. In the fourth embodiment, the work machine 500 being working on continues to work, the work machine 400 on standby starts up the internal combustion engine in the standby state, and performs charging while idling. In other words, according to the first embodiment, the work machine 500 stops the work, and the work machine 400, which has reached the power storage threshold, is activated, whereby the work machine 400 is charged, but the fourth embodiment is different from the first embodiment in that the work on the work machine 500 does not stop the work and the work machine 400 on standby starts up the internal combustion engine to perform charging while idling.

In the fourth embodiment, the steps until the actual machine management device 300 notifies the remote operation device 200 that the remaining amount of power storage has reached power storage threshold (STEP 329 in FIG. 4) are the same as those in the first embodiment and will not be described. In the fourth embodiment, at the time of the notification, the remote operation device 200 activates the work machine 400 on standby, displays on the remote image output device 221 that the internal combustion engine starts up for performing charging, and notifies the operator. The remote image output device 221 displays, for example, "A battery capacity of excavator A is decreasing. Remote charging will start."

Figure 6:
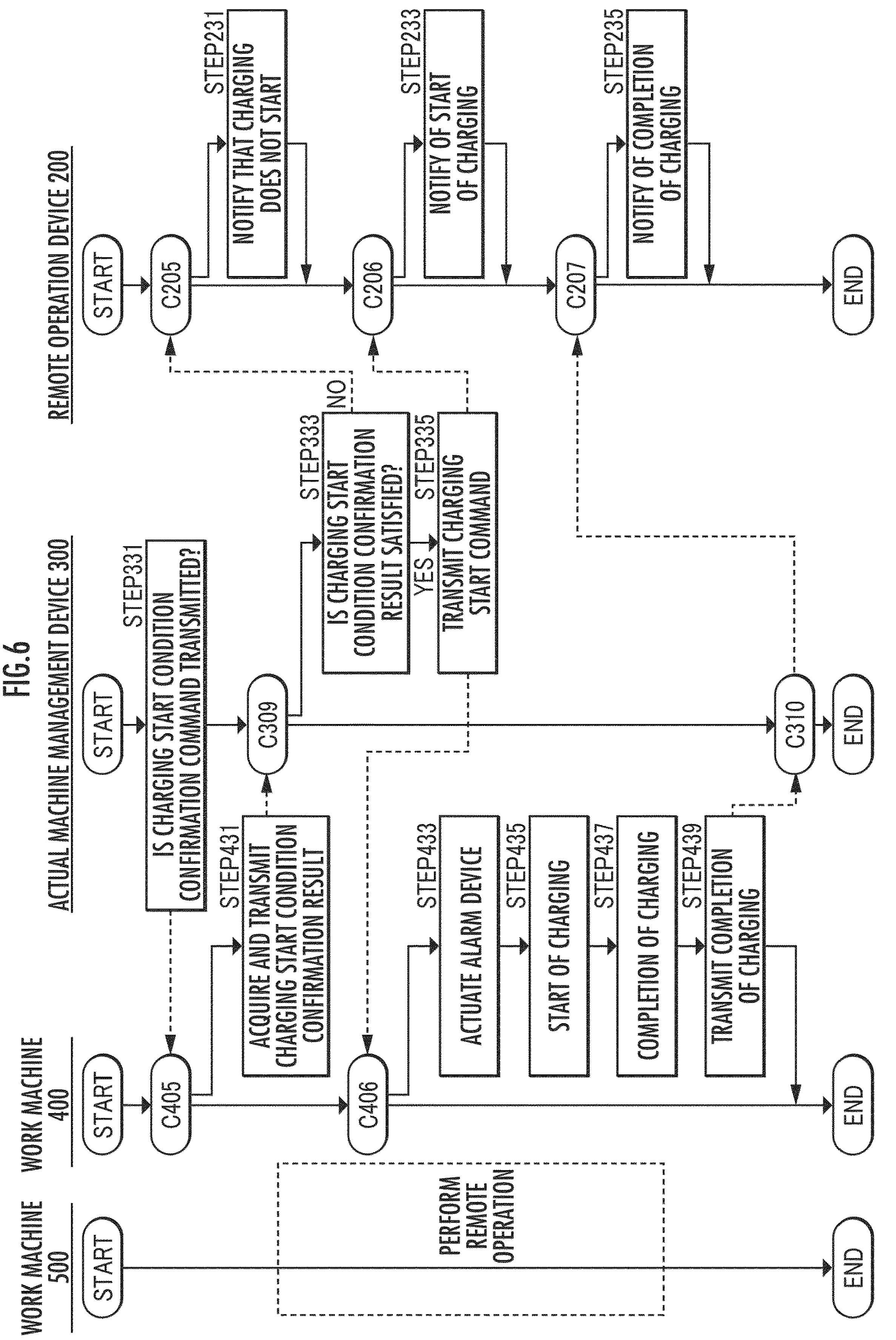
FIG. 6 is a flowchart showing a management process of the remaining amount of power storage according to a fourth embodiment of a work machine on standby in the actual machine management system shown in FIG. 1.

In FIG. 6, the actual machine management device 300 transmits a charging start condition confirmation command to the work machine 400 for which it is determined in the first embodiment that the remaining amount of power storage has reached the power storage threshold (STEP 329 in FIG. 4) (STEP 331). In response, the work machine 400 receives the charging start condition confirmation command (C405). The charging start condition is a confirmation condition for confirming whether a condition for starting charging are satisfied when the unmanned work machine 400 starts charging by the remote operation. The charging start condition includes, for example, whether a safety device for locking the operation lever of the work machine 400 on standby is actuating normally, and whether there is no emergency stop operation by an emergency stop unit owned by a site manager at the construction site. The safety device for locking the operation lever is actuated when the work machine 400 receives the charging start condition confirmation command, and locks the operation lever. The detection device can detect that the safety device has actuated normally. Further, the actual machine wireless communication device 421 can detect the presence or absence of the emergency stop operation by the emergency stop unit owned by the site manager.

After confirming the status of the charging start condition, the work machine 400 transmits a confirmation result of the charging start condition to the actual machine management device 300 (STEP 431). In response, the actual machine management device 300 receives the confirmation result of the charging start condition (C309).

The actual machine management device 300 determines whether the charging start condition is satisfied. When even one charging start condition is not satisfied, the actual machine management device 300 transmits to the remote operation device 200 that the charging will not start (STEP 333). In response, the remote operation device 200 receives that the charging will not start (C205).

The remote operation device 200 notifies the operator that the charging will not start (STEP 231).

When the charging start condition is satisfied, the actual machine management device 300 transmits a charging start command to the work machine 400 (STEP 335). In response, the work machine 400 receives the charging start command (C406). Further, the actual machine management device 300 also transmits the charging start command to the remote operation device 200 (STEP 335). In response, the remote operation device 200 receives the charging start command (C206).

The remote operation device 200 displays the start of charging on the remote image output device 221 (STEP 233) for notification. For example, "Remote charging of excavator A has started." is displayed on the remote image output device 221. At this time, a scheduled charging operation time defined in advance for each work machine 400 is also notified together with the above notification contents.

The work machine 400, that has received the charging start command, actuates the alarm device 470 (STEP 433). Thereafter, the internal combustion engine is started up to perform charging of the power storage device 440 while idling. The alarm device 470 is a device that optically and/or acoustically notifies those around the work machine 400 that the internal combustion engine of the work machine 400 will be started up and charging is started. The alarm device 470 is, for example, a lighting device such as a revolving light or a lamp, or a blinking device. Alternatively, the alarm device 470 is, for example, a sound device such as a horn or a siren.

After the alarm device 470 is actuated, the internal combustion engine of the work machine 400 starts up, the charging device 450 functions, and the charging of the power storage device 440 is started (STEP 435).

After the charging for a predetermined time, the work machine 400 stops idling and completes the charging (STEP 437).

The work machine 400 transmits the completion of charging to the actual machine management device 300 (STEP 439). In response, the actual machine management device 300 receives the completion of charging (C310). Further, the completion of charging is also transmitted to the remote operation device 200, and the remote operation device 200 receives the completion of charging (C207).

The remote operation device 200 displays the completion of charging on the remote image output device 221 to notify it to the operator (STEP 235).

According to the fourth embodiment, since the power storage device 440 of the work machine 400 on standby can be charged, the work machine 500 being working on can continue to work without being interrupted due to the power storage state of the work machine 400. Further, even at the point of time before the power storage threshold is reached, the power storage device 440 of the work machine 400 on standby can be charged as necessary, for example, can be charged in advance.

The configuration has been described in the fourth embodiment in which the charging is automatically started after the start of charging is notified, but the charging may be started by manual operation of the operator. For example, when the charging start condition is satisfied as a confirmation result of the charging start condition received by the actual machine management device 300 (C309), the remote image output device 221 displays, for example, "A battery capacity of excavator A is decreasing. Do you want to start remote charging.", to prompt the operator to perform manual operation. After this display, when there is an instruction to start charging by manual operation, the actual machine management device 300 transmits the charging start command to the work machine 400 (STEP 335). The start instruction is performed, for example, by an operation on a tap regarding a selection item displayed on the display screen of the remote image output device 221 or by an operation on a button provided on any one of the plurality of operation levers. Thereby, it is possible to prevent the internal combustion engine of the work machine 400 from being started unnecessarily when there is no plan to use the work machine 400. The charging can be started manually at any point of time as long as the work machine 400 is in the standby state, regardless of the power storage amount of the power storage device 440. Further, the charging may be manually completed at any point of time.

Since the actual machine management device of the present invention performs the notification regarding the remaining amount of power storage of the power storage device when the predefined power storage threshold is reached for each standby work machine, or when the predefined power storage threshold is estimated to be reached, even when a plurality of work machines are remotely operated, it is possible to know the decrease in the remaining amount of power storage of the each of the standby work machines, and to appropriately manage the remaining amount of power storage of the power storage device.

Preferably, the actual machine management device of the present invention is capable of simultaneously outputting the power storage information of each of the two or more work machines, including at least the standby work machine among the plurality of work machines being remotely operated, to the notification device.

Since the actual machine management device of the present invention can simultaneously output the power storage information of two or more work machines including at least a standby work machine, to the notification device, even when a plurality of work machines are remotely operated, it is possible to reliably know the remaining amount of power storage of the each of the standby work machines. Therefore, it is possible to appropriately manage the remaining amount of power storage of the power storage device.

In the actual machine management device of the present invention, preferably, the power storage information to be output by the actual machine management device includes an icon having a figure, and the icon indicating the power storage information of the work machine that has become equal to or less than the power storage threshold is displayed with a time change in icon display for at least a part of the icon.

Since the actual machine management device of the present invention displays the icon indicating the power storage information with a change in time, the operator can easily notice the icon for notifying the decrease in the amount of power storage even when the operator is operating the work machine while looking at surrounding images thereof. Therefore, it is possible to easily know the remaining amount of power storage of the standby work machine, and to appropriately manage the remaining amount of power storage of the power storage device.

In the actual machine management device of the present invention, preferably, the power storage information is transmitted when the remaining amount of power storage of the power storage device of each of the standby work machines becomes equal to or less than the predefined power storage threshold for each of the work machines, and the actual machine management device transmits the power storage information to the notification device upon receiving the power storage information.

In the actual machine management device of the present invention, when the remaining amount of power storage of the power storage device of each of the standby work machines becomes equal to or less than the power storage threshold determined for each work machine, the power storage information is transmitted and notified. Therefore, it is possible to know that the decrease in the remaining amount of power storage at the point of time when the remaining amount of power storage for each standby work machine has decreased to the power storage threshold.

In the actual machine management device of the present invention, preferably, the power storage information to be transmitted is transmitted when each of the standby work machines transitions to the standby state, and when the standby work machine is in the standby state, power from the power storage device is supplied only to the communication device that performs transmission and reception with the actual machine management device.

In the actual machine management system of the present invention, in the standby work machine being in the standby state, since the power from the power storage device is supplied only to the communication device that performs transmission and reception with the actual machine management device, the power consumption during the standby can be minimized. Therefore, it is possible to appropriately manage the power storage amount of the power storage device.

Preferably, the actual machine management device of the present invention includes an estimation unit that, based on the received power storage information and power consumption characteristics of the standby work machine that transmits the power storage information, estimates a time until the remaining amount of power storage of the power storage device of the standby work machine decreases to the power storage threshold determined for each of the work machines, and the actual machine management device transmits the power storage information to the notification device when the time estimated by the estimation unit elapses.

Since the actual machine management device of the present invention includes the estimation unit that estimates the time until the remaining amount of power storage of the power storage device of the standby work machine decreases to the power storage threshold determined for each work machine, even in the state in which the power from the power storage device is supplied only to the communication device, which performs transmission and reception with the actual machine management device, in order to reduce power consumption, it is possible to know that the decrease in the remaining amount of power storage at the point of time when the remaining amount of power storage for each standby work machine has decreased to the power storage threshold.

Preferably, the actual machine management device of the present invention transmits a charging start command in response to a charging start operation performed by an operator who remotely operates the work machine, and actuates a drive source of the standby work machine to charge the power storage device of the standby work machine.

In the actual machine management system of the present invention, since the charging can be performed by the operation of the operator, it is possible to appropriately manage the power storage amount of the power storage device.

Preferably, the actual machine management device of the present invention transmits a charging completion command and stops the drive source after actuating the drive source of the standby work machine for a predetermined time, and transmits charging completion information to the notification device.

Since the actual machine management device of the present invention can stop the drive source after the actuation for a predetermined time and can also transmit the charging completion information to the notification device, it can notify the operator that the charging of the power storage device is completed. Therefore, it is possible to appropriately manage the power storage amount of the power storage device.

Preferably, the actual machine management system of the present invention includes the actual machine management device, the notification device, and at least one of the plurality of work machines.

Since the actual machine management system of the present invention includes the actual machine management device, the notification device, and at least one of a plurality of work machines, it is possible to appropriately control each of the components and appropriately manage the power storage amount of the power storage device.

REFERENCE SIGNS LIST

100 actual machine management system

200 remote operation device

221 remote image output device (notification device)

225 remote sound output device (notification device)

300 actual machine management device

400, 500 work machine

421 actual machine wireless communication device (communication device)

440 power storage device

The invention claimed is:

1. An actual machine management device configured to manage a plurality of work machines to be remotely operated by a remote operation device, each work machine comprising a power storage device and a communication device capable of transmitting power storage information regarding remaining amount of power storage of the power storage device, the plurality of work machines including a first work machine currently in an operation state and a second work machine currently in a standby state, wherein, when the actual machine management device receives from the remote operation device a command of switching an actual operation work machine from the first work machine to the second work machine, the actual machine management device is configured to set the first work machine from the operation state to the standby state and set the second work machine from the standby state to the operation state, based on power storage information transmitted from the first work machine currently in the standby state and not actuated by remote operation, transmit the power storage information to a notification device at timing of notification about the remaining amount of power storage of the power storage device of the first work machine currently in the standby state, the timing being a time when the remaining amount of power storage of the power storage device of the first work machine currently in the standby state reaches a predefined power storage threshold or is estimated to reach the predefined power storage threshold, while the actual machine management device is configured to transmit a work command received from the remote operation device to the second work machine currently in the operation state, so that an operator of the remote operation device can monitor the remaining amount of the power storage device of the first work machine currently in the standby state while operating the second work machine in the operation state, and wherein the actual machine management device transmits a charging start command in response to a charging start operation performed by the operator who remotely operates the second work machine in the operation state, and actuates a drive source of the first work machine in the standby state to charge the power storage device of the first work machine.

2. The actual machine management device according to claim 1, wherein the actual machine management device is capable of simultaneously outputting the power storage information of each of the two or more work machines in the standby state, including the first work machine currently in the standby state among the plurality of work machines, to the notification device of the remote operation device.

3. The actual machine management device according to claim 1, wherein the power storage information to be transmitted by the actual machine management device to the notification device includes data for an icon having a figure, and the icon indicating the power storage information of the first work machine in the standby state that has become equal to or less than the power storage threshold is displayed on a display region of the notification device with a time change in icon display for at least a part of the icon.

4. The actual machine management device according to claim 1, wherein the actual machine management device, based on the power storage information transmitted from each of the communication devices of the work machines in the standby state and are not actuated by remote operation, including the first work machine currently in the standby state, among the plurality of work machines, transmits the power storage information to the notification device of the remote operation device at timing of notification about the remaining amount of power storage of the power storage devices, the timing being a time when for each of the work machines in the standby state the remaining amount of power storage of the power storage device reaches a predefined power storage threshold or is estimated to reach the predefined power storage threshold, the power storage information is transmitted when the remaining amount of power storage of the power storage device of each of the work machines in the standby state becomes equal to or less than the predefined power storage threshold for each of the work machines in the standby state, and the actual machine management device transmits the power storage information to the notification device of the remote operation device upon receiving the power storage information.

5. The actual machine management device according to claim 1, wherein the actual machine management device, based on the power storage information transmitted from each of the communication devices of the work machines in the standby state and are not actuated by remote operation, including the first work machine currently in the standby state, among the plurality of work machines, transmits the power storage information to the notification device of the remote operation device at timing of notification about the remaining amount of power storage of the power storage devices, the timing being a time when for each of the work machines in the standby state the remaining amount of power storage of the power storage device reaches a predefined power storage threshold or is estimated to reach the predefined power storage threshold, the power storage information is transmitted when each of the work machines transitions to the standby state, and in the work machines in the standby state including the first work machine in the standby state, power of the power storage device is supplied only to the communication device that performs transmission and reception with the actual machine management device.

6. The actual machine management device according to claim 5, wherein the actual machine management device, based on the received power storage information and power consumption characteristics of each of the work machines in the standby state that transmits the power storage information, estimates an estimated time until the remaining amount of power storage of the power storage device of the standby work machine decreases to the power storage threshold determined for each of the work machines in the standby state, and the actual machine management device transmits the power storage information to the notification device of the remote operation device when the estimated time for each of the work machines in the standby state elapses.

7. The actual machine management device according to claim 1, wherein the actual machine management device transmits a charging completion command and stops the drive source after actuating the drive source of the work machines in the standby state, including the first work machine currently in the standby state for a predetermined time, and transmits charging completion information to the notification device.

8. An actual machine management system comprising the actual machine management device according to claim 1, at least the notification device, and the first and second work machines.

* * * * *